US007263051B2

(12) United States Patent
Verbakel et al.

(10) Patent No.: US 7,263,051 B2
(45) Date of Patent: *Aug. 28, 2007

(54) STORING AUDIO-CENTERED INFORMATION WITH A MULTI-LEVEL TABLE-OF CONTENTS (TOC) MECHANISM HAVING REDUNDANT SUB-TOCS

(75) Inventors: Johannes M. M. Verbakel, Eindhoven (NL); Johannes J. Mons, send to query (JP); Muneyasu Maeda, Kanagawa-Prefecture (JP); Yoshizumi Inazawa, Kanagawa-Prefecture (JP); Tadao Suzuki, Tokyo (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 873 days.

This patent is subject to a terminal disclaimer.

(21) Appl. No.: 10/056,366

(22) Filed: Jan. 25, 2002

(65) Prior Publication Data

US 2002/0114252 A1    Aug. 22, 2002

Related U.S. Application Data

(63) Continuation of application No. 09/328,024, filed on Jun. 8, 1999, now Pat. No. 6,370,090.

(30) Foreign Application Priority Data

Jun. 10, 1998 (EP) .................................. 98201940

(51) Int. Cl.
*G11B 17/22* (2006.01)

(52) U.S. Cl. ................................. 369/59.25; 369/30.04; 369/53.24; 369/47.13; 369/275.3

(58) Field of Classification Search ............. 369/53.25, 369/53.29, 47.21, 47.25, 275.3, 30.04, 47.54, 369/53.22, 47.13, 53.24, 47.1, 98, 59.25, 369/124.07; 386/36.116, 111.65, 126.121, 386/85, 116, 98, 125, 126; 360/72.2, 48; 711/112

See application file for complete search history.

(56) References Cited

U.S. PATENT DOCUMENTS 5,319,505 A * 6/1994 Adachi ...................... 360/72.2

(Continued)

FOREIGN PATENT DOCUMENTS

EP        0402973 A1    12/1990

(Continued)

OTHER PUBLICATIONS

J.J. van der Kaam, "A Digital Decimating Filter fr Analog-to-Digitaln Conversion of Hi-Fi Audio Signals", Philips Techn. Rev. 42, No. 6/7, Apr. 1968, pp. 230-238.

(Continued)

*Primary Examiner*—William Korzuch
*Assistant Examiner*—Kim-Kwok Chu
(74) *Attorney, Agent, or Firm*—Michael E. Belk

(57) ABSTRACT

Audio-centered information is stored on a unitary medium by using a Table-of-Contents (TOC) mechanism that specifies an actual configuration of various audio items on the medium. In particular, each one of a set of one or more Track Areas gets at least two mutually logically conforming Sub-TOCs assigned. This allows to retrieve any constituent Sub-TOC part from at least any correct copy of the Sub-TOCs. Furthermore, one or more Master-TOCs are provided for specifically pointing to each of the Sub-TOCs.

33 Claims, 4 Drawing Sheets

U.S. PATENT DOCUMENTS

| | | | |
|---|---|---|---|
| 5,384,674 A * | 1/1995 | Nishida et al. | 360/72.2 |
| 5,592,450 A * | 1/1997 | Yonemitsu et al. | 386/96 |
| 5,737,639 A | 4/1998 | Ohmori | 395/893 |
| 5,754,521 A * | 5/1998 | Yokota | 369/275.3 |
| 6,198,877 B1 * | 3/2001 | Kawamura et al. | 386/98 |
| 6,269,338 B1 | 7/2001 | Bruekers et al. | 704/500 |
| 6,275,457 B1 * | 8/2001 | Maeda | 369/47.21 |
| 6,289,306 B1 | 9/2001 | Van der Vleuten et al. | 704/219 |
| 6,308,004 B2 * | 10/2001 | Kawamura et al. | 386/95 |
| 6,370,090 B1 * | 4/2002 | Verbakel et al. | 369/30.04 |
| 6,580,679 B1 * | 6/2003 | Maeda | 369/275.3 |
| 6,813,681 B1 * | 11/2004 | Kanota et al. | 369/47.1 |

FOREIGN PATENT DOCUMENTS

| | | |
|---|---|---|
| EP | 0709843 A2 | 1/1996 |
| WO | IB9901058 | 6/1999 |

OTHER PUBLICATIONS

Kirk C.H. Chao et al., "A Higher Order Topology for Interpolative Modulators for Oversampling A/D Converters", IEEE Trans. On Circuits and Systems, vol. 37, No. 3, Mar. 1990, pp. 309-318.

* cited by examiner

STORING AUDIO-CENTERED INFORMATION WITH A MULTI-LEVEL TABLE-OF CONTENTS (TOC) MECHANISM HAVING REDUNDANT SUB-TOCS

CROSS REFERENCE TO RELATED APPLICATIONS

This is a continuation divisional of application Ser. No. 09/328,024, filed Jun. 8, 1999 now U.S Pat. No. 6,370,090.

BACKGROUND OF THE INVENTION

Storing digital audio on unitary media such as disc or tape is widespread. In case of actual sub-division of the audio into multiple sub-items, providing a Table-of-Contents (TOC) allows to access the information in an easy manner. Such TOC will specify at least what has been stored and where it has been stored. The audio may be defined according to various standardized audio formats, such as two-channel stereo, multiple (5-6) channel audio such as in surround sound applications, and possibly others. An audio provider may wish to combine various track areas having the same and/or different such formats on a single medium such as an optical disc.

SUMMARY TO THE INVENTION

In consequence, amongst other things, it is an object of the present invention to allow an audio management system to allow a user to access various audio track areas in a fast and easy manner. A user is now able to distinguish between various track areas and to navigate among the various items of a single track area in a robust manner, and if possible, without encumbrance through data errors in the TOC itself.

The invention also relates to a unitary storage medium produced by the method, to a storing device arranged for practicing such method, and to a reader or player device arranged for interfacing to such storage medium. A particular audio medium instance could be restricted to storing only stereo, so that the multi-channel version would effectively be a dummy. For reasons of standardizing, the multilevel TOC mechanism will then also be adopted. Further advantageous aspects of the invention are recited in dependent claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1A:
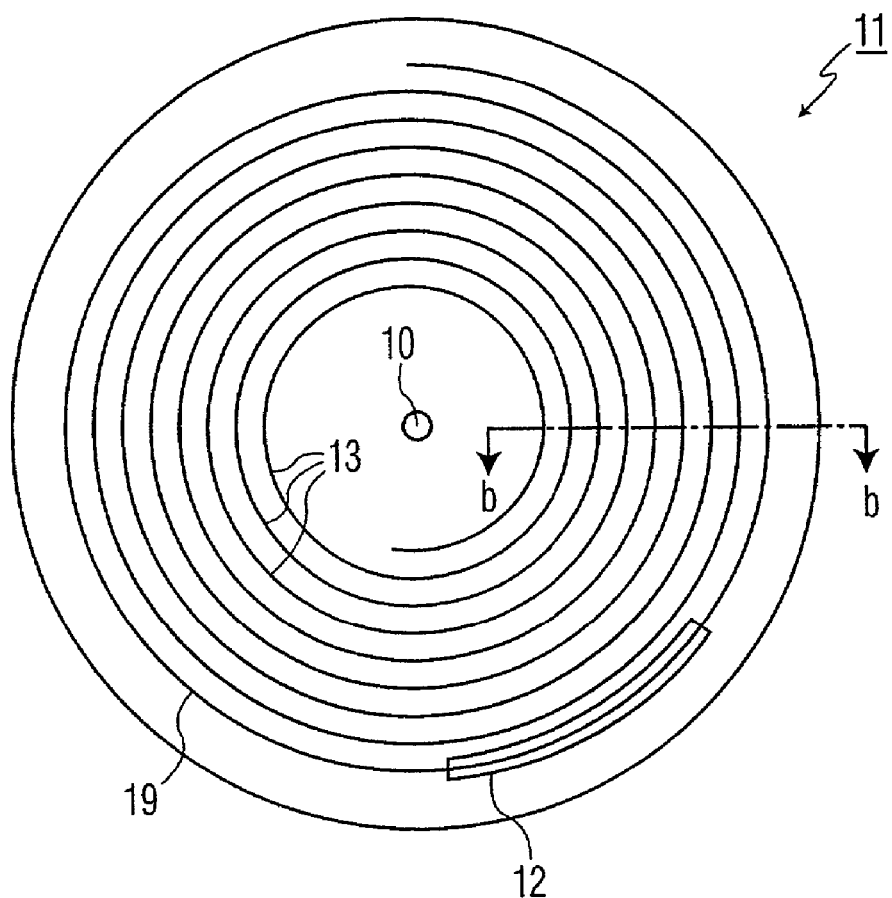
FIGS. 1a and 1b depict a record carrier of the invention.

FIG. 1a shows a disc-shaped record carrier 11 with track 19 and central hole 10. Track 19 has a spiral pattern of turns forming substantially parallel tracks on an information layer. The carrier may be an optical disc with a recordable or prerecorded information layer. CD-R, CD-RW and DVD-RAM are recordable discs. Audio CD is a prerecorded disc. Prerecorded discs may be manufactured by first recording a master disc and then pressing consumer discs. Track 19 on a recordable record carrier may be formed by a preembossed track structure. The track may be configured as pregroove 14 to allow a read/write head to follow the track 19 during scanning. The information is recorded on the information layer by optically detectable marks along the track, e.g. pits and lands.

Figure 1B:
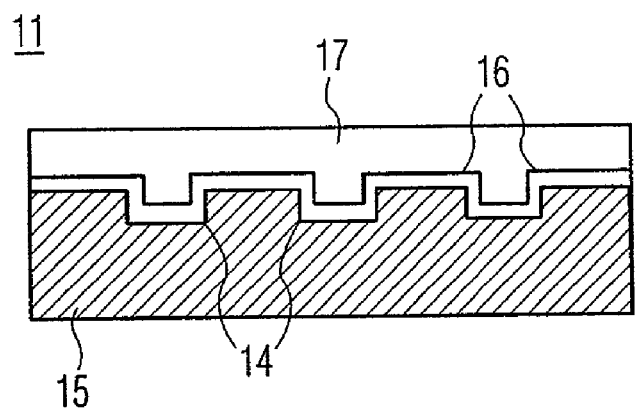

FIG. 1b is a cross-section along the line b-b of a recordable record carrier 11, wherein transparent substrate 15 caries recording layer 16 and protective layer 17. Pregroove 14 may be implemented as an indentation, an elevation, or as a material property deviating from its surroundings.

For user convenience, the audio information on the record carrier is subdivided into items, which may have a duration of a few minutes e.g. songs in an album or movements of a symphony. The carrier will also contain access information to identify the items, such as a Table Of Contents (TOC) or a file system like ISO 9660 for CD-ROM. The access information may include playing time and start address for each item, and further information like a song title.

The audio information is recorded in digital representation after analog to digital (A/D) conversion. Examples of A/D conversion are PCM 16-bit per sample at 44.1 kHz known from CD audio and 1 bit Sigma Delta modulation at a high oversampling rate e.g. 64×Fs called Bitstream. The latter is a high quality encoding method, allowing either high quality decoding or low quality decoding. Reference is had to the publications 'A digital decimating filter for analog-to-digital conversion of hi-fi audio signals', by J. J. van der Kam, document D5 infra, and 'A higher order topology for interpolative modulators for oversampling A/D converters', by Kirk C. H. Chao et al, document D6. After A/D conversion, digital audio may be compressed to variable bitrate audio data for recording on the information layer. The compressed audio data is read from the carrier at such speed that after decompression substantially the original timescale will be restored when continuously reproducing the audio. Hence the compressed data must be retrieved from the record carter at a speed dependent on the varying bitrate. The data is retrieved at so-called transfer speed, i e. the speed of transferring data bytes from the record carrier to a decompressor. Providing the record carrier with constant spatial data density gives the highest data storage capacity per unit of area. The transfer speed is proportional to the relative linear speed between the medium and the read/write head. With buffer before the de-compressor, actual transfer speed is the speed before that buffer.

Figure 2:
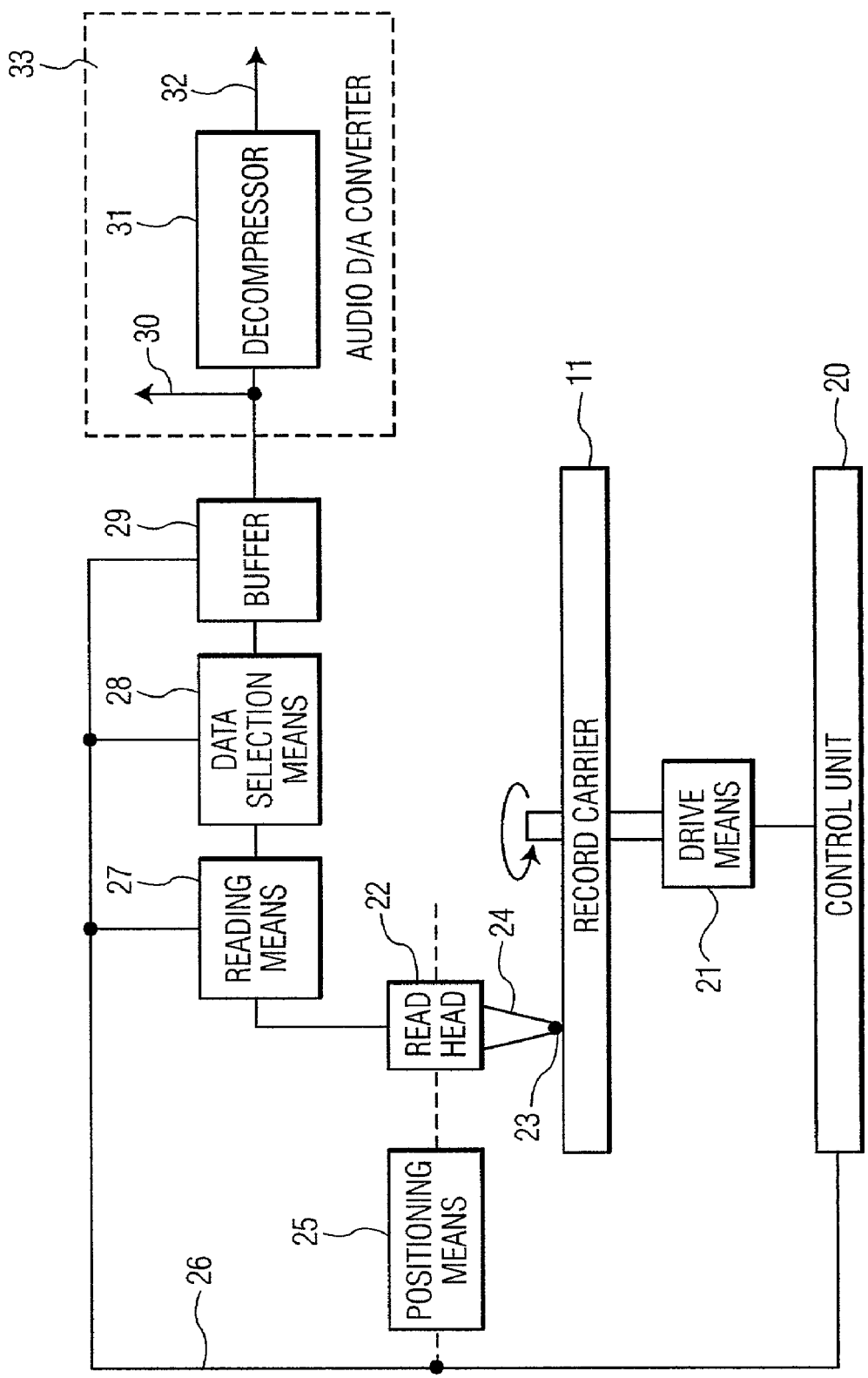
FIG. 2 depicts a playback device of the invention.

FIG. 2 shows a playback apparatus according to the invention for reading a record carrier 11 of the type shown in FIG. 1. The device has drive means 21 for rotating carrier 11 and read head 22 for scanning the record track, Positioning means effect 25 coarse radial positioning of read head 22. The read head comprises a known optical system with a radiation source for generating beam 24 that is guided through optical elements and focused to spot 23 on an information track. The read head further comprises a focusing actuator for moving the focus of the radiation 24 along the optical axis of the beam and a tracking actuator for fine positioning of spot 23 in a radial direction on the centre of the track. The tracking actuator may comprise coils for moving an optical element or may be arranged for changing the angle of a reflecting element. The radiation reflected by the information layer is detected by a known detector in the read head 22, e.g. a four-quadrant diode, to generate a read signal and further detector signals including tracking error and focusing error signals for the tracking and focusing actuators, respectively. The read signal is processed by standard reading means 27 to retrieve the data, for example through a channel decoder and an error corrector. The retrieved data is sent to data selection means 28, to select the compressed audio data for feeding to buffer 29, The selection is based on data type indicators also present on the carrier, e.g. headers in a framed format. From buffer 29, the compressed audio data go to de-compressor 31 as signal 30. Decompressor 31 decodes the compressed audio data to reproduce the original audio information on output 32. The de-compressor may be fitted in a stand-alone audio D/A convertor 33, or the buffer may be positioned before the data selection. Buffer 29 may reside separately or may be combined with a buffer in the decompressor. The device furthermore has a control unit 20 for receiving control commands from a user or from a host computer not shown, that via control lines 26 is connected to drive means 21, positioning means 25, reading means 27 and data selection means 28, and possibly also to buffer 29 for filling level control. To tis end, the control unit 20 may comprise digital control circuitry, for performing the procedures described below.

The art of audio compression and decompression is known. Audio may be compressed after digitizing by analyzing the correlation in the signal. and producing parameters for fragments of a specified size. During de-compression the inverse process reconstructs the original signal. If the original digitized signal is reconstructed exactly, the (de-)compression is lossless. Lossy (de) -compression will not reproduce some details of the original signal which will be substantially undetectable by the human ear or eye. Most known systems for audio and video, such as or MPEG, use lossy compression, whereas lossless compression is used for computer data. Examples of audio compression and decompression are given in D2, D3 and D4 hereinafter, Data selection means 28 will retrieve from the read data certain control information, in particular indicating the transfer speed profile. The data selection means 28 will also discard any stuffing data, that had been added during recording according to the speed profile. When the control unit 20 is commanded to reproduce an audio item from the record carrier, positioning means 25 will position the reading head on the portion of the track containing the TOC. The starting address and the speed profile for that item will then be retrieved from the TOC via the data selection means 28. Alternatively, the contents of the TOC may be read only once and stored in a memory when the disc is inserted in the apparatus. For reproducing an item, drive means 21 will rotate the record carrier at the speed indicated by the speed profile. The required rotation rate may be given as such in the speed profile for setting the drive means. Alternatively the speed profile may comprise a bitrate, and then the rotation rate can be calculated as follows. The radial position of the item can be calculated from the starting address, because the record carrier density parameters like track pitch and bit length, will be known to the playback device, usually from a standard. Subsequently the rotation rate can be derived from the bitrate and the radial position. To provide continuous reproduction without buffer underflow or overflow the transfer speed is coupled to the reproduction speed of the D/A converter, i.e. to the bit-rate after decompression. Thereto the apparatus may comprise a reference frequency source for controlling the decompressor and the rotation rate may be set in dependence on the reference frequency and the speed profile. The rotation rate may also be adjusted by the average filling level of the buffer 29, e.g. lowering rotation rate when the buffer is more than 50% full on average.

Figure 3:
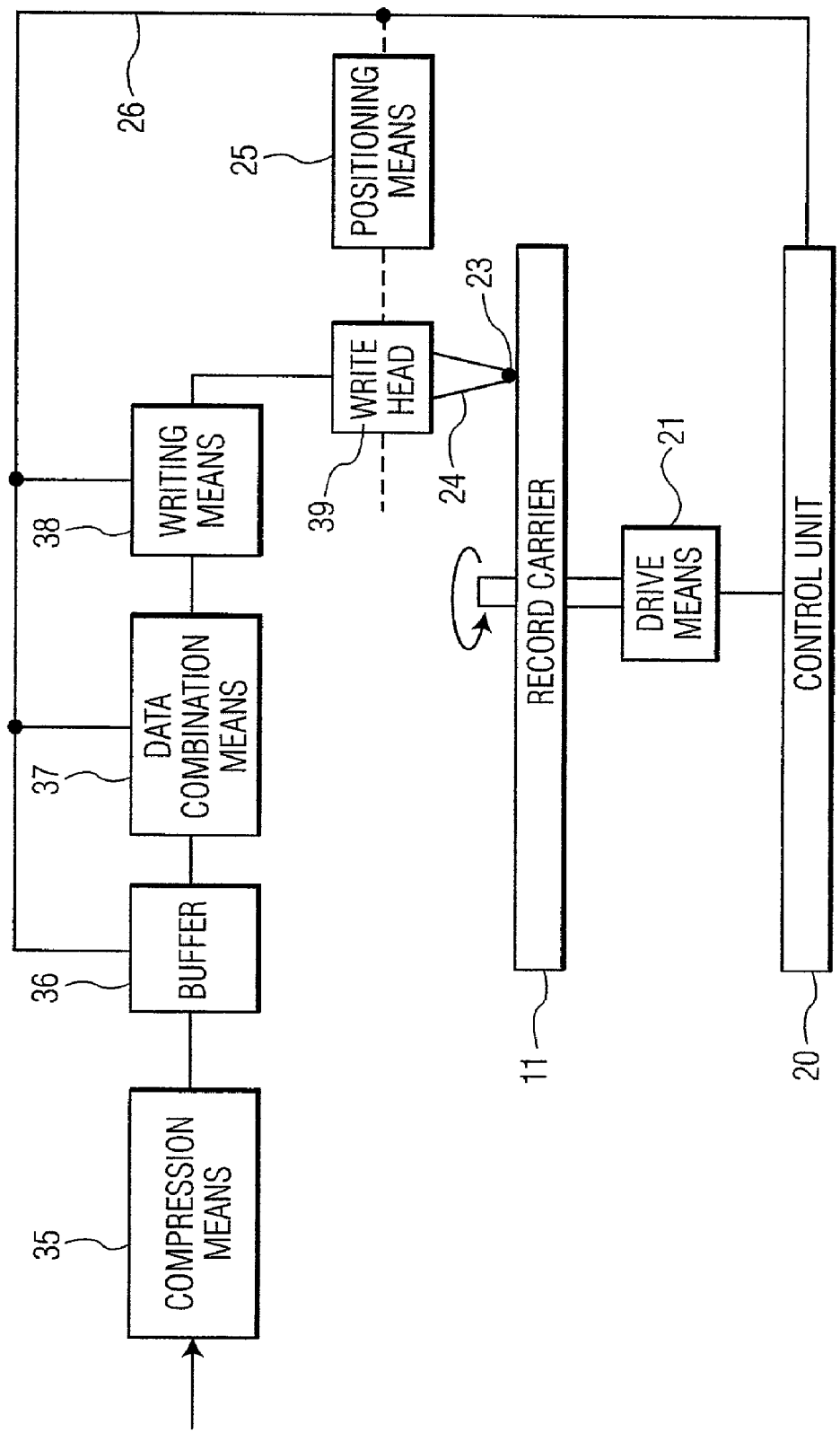
FIG. 3 depicts a recording device of the invention.

FIG. 3 shows a recording device for writing information on a (re)writable record carrier 11. During a writing operation, marks representing the information are formed on the record carrier. The marks may be in optically readable form, e.g. as areas whose reflection differs from their surroundings, by recording in materials such as dye, alloy or phase change, or in the form of areas with a direct of magnetization different from their surroundings. Writing and reading of information for recording on optical disks and usable rules for formatting, error correcting and channel coding, are well-known, e.g. from the CD system. Marks may be formed through a spot 23 generated on the recording layer via a beam 24 of electromagnetic radiation, usually from a laser diode. The recording device comprises similar basic elements as described with reference to FIG. 2, i.e. a control unit 20, drive means 21 and positioning means 25, but it has a distinctive write head 39. Audio information is presented on the input of compression means 35. Suitable compression has been described in D2, D3 and D4. The variable bitrate compressed audio on the output of compression means 35 is sent to buffer 36. From buffer 36 the data is sent to data combination means 37 for adding stuffing data and further control data. The total data stream is sent to writing means 38 for recording. Write head 39 is coupled to the writing means 38, which comprise for example a formatter, an error encoder and a channel modulator. The data presented to the input of writing means 38 is distributed over logical and physical sectors according to formatting and encoding rules and converted into a write signal for write head 39. Unit 20 controls buffer 36, data combination means 37 and writing means 38 via control lines 26 and perform the positioning procedure as described above for the reading apparatus. The recording apparatus may also have the features of a playback apparatus and a combined write/read head.

Figure 4:
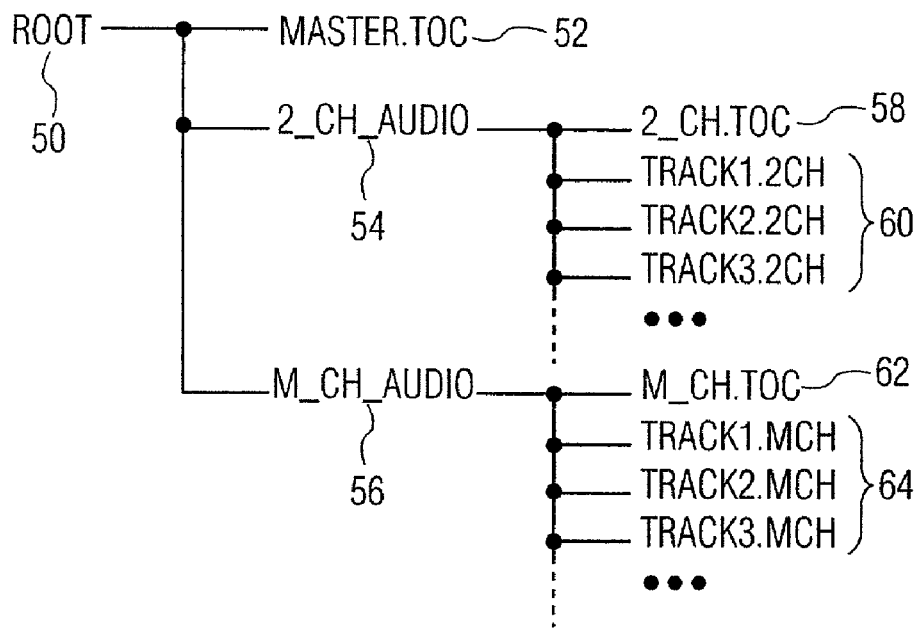
FIG. 4 depicts a file system invention used in the record carrier of FIG. 1.

FIG. 4 shows a file system for use with the invention, for which various different options are feasible. The inventors have proposed that the storage medium should be based on a UDF file system or on an ISO 9660 file system, both of which systems are standard to a skilled art person. In the alternative case, no file system should be present at all and the relevant sector spaces should be kept empty.

In the file system, all audio will be stored in Audio Files located in SubDirectory SCD_AUDIO. As shown in FIG. 4, the hierarchy is based on ROOT file 50 that points to various subaltern files 52, 54, 56. The structure of MASTER.TOC 52, here single, will be discussed hereinafter. Further, there is a 2_CH_AUDIO file 54. This points to TOC 2_CH_TOC 58 and also to the various stereo tracks TRACKn.2CH 60. Furthermore, M_CH_AUDIO file 56 points to TOC M_CH_TOC 62 and in parallel therewith to the various multi-channel tracks TRACKn.MCH 64.

Figure 5:
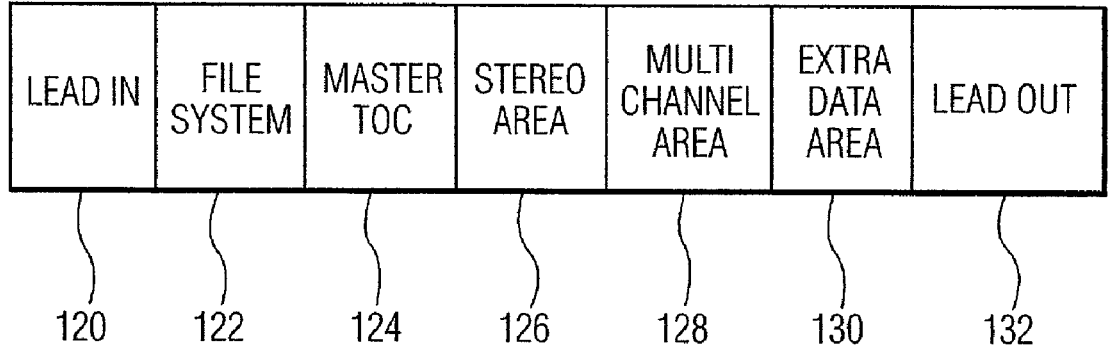
FIG. 5 depicts a storage arrangement invention for the record carrier of FIG. 1.

FIG. 5 shows a first storage arrangement for use with the invention, which by way of example has been mapped on a single serial track. Along the horizontal axis the following items are evident. Item 120 is a Lead-in area that is used for mutually synchronizing the reader and the driving of de medium. Item 122 represents the File System disclosed with reference to FIG. 4. Item 124 represents a MASTER_TOC that may be configured according to standard procedures and pertains to subsequent items Stereo AREA 126 and Multi-channel AREA 128, and if necessary also to Extra Data AREA 130. The lengths of these three areas need not be standardized, inasmuch as various different amounts of information may be present. With respect to the audio areas, the audio track areas proper, as well as the associated SUB$_{13}$TOCs are included. Apart from the disclosure hereinafter, the contents of items 126, 128, 130 may be defined according to conventional standards that by themselves do not constitute part of the invention. Generally, the two audio areas may have the same structure and contain the same kinds of information, apart from distinguishing between the various channels. The audio may be plan coded or loss-less coded. All kinds of audio may be multiplexed with supplementary data, such as Compact Disc Text.

Item 132 represents a Lead-Out Information. The latter item is used in particular during search operations. Its tracks do not contain information further than track numbers and addresses. The number of lead-out tracks may cover a ring of some 0.5 to 1 millimeter wide. According to the above, the stored information may either be accessed via the file system as laid down in item 122, or via the TOC structure laid down in item 124, and more particular, via a two- or multi-level TOC structure to be discussed hereinafter.

Any of the single or plural Master TOCs 124 will begin at a respective uniformly standardized offset position from the start of the Lead-in area, such as at byte number 500 for the first Master TOC. In the embodiment a Master-TOC measures only one standard-size sector and primarily contains pointers to the various Sub-TOCs or Area-TOCs to be disclosed hereinafter. A preferred syntax of a Master-TOC is as follows:

1. A 16-byte Signature identifies the Master-TOC, such as by "SACD Master TOC", the signature containing three space characters, but the apostrophes not being part of the definition.
2. A 2-byte Spec_version indicates the version number of the format used in the disc.
3. A 14-byte Space has been reserved, such as for alignment stuffing.
4. A 4-byte integer 2CH-start_address contains the logical address of the first sector of the stereo area.
5. A 4-byte integer 2CH-end_address contains the logical address of the last sector of the stereo area.
6. A 4-byte integer MC-start_address contains the logical address of the first sector of the Multi channel area.
7. A 4-byte integer MC-end_address contains the logical address of the last sector of the Multi channel area.
8. A 4-byte integer Extra_data_start_address contains the logical address of the first sector of the Extra Data area.
9. A 4-byte integer Extra_data_end_address contains the logical address of the last sector of the Extra Data area.

The total information pertaining to the above is 56 bytes. Further features may be added to a Master-TOC. If a certain area, such as the stereo area, the Multi channel area, or the Extra Data area is not present, both start and end addresses of the area in question have value zero.

Next, items 126 and 128 will contain Sub-TOCS or Area-Tocs for the Stereo and Multi-Channel Audio intervals, respectively, formatted as will be disclosed hereinafter with respect to FIG. 6. A preferred syntax of a Sub-TOC is as follows:

1. A 16-byte Signature identifies the Sub-TOC in question such as by "SACD stereo TOC" for a stereo audio area and "SACD MC TOC" for a Multi Channel audio area, the number of bytes being attained by adding trailing space characters.
2. A 2-byte Spec_version indicates the version number of the format used in the disc.
3. A 4-byte Sub_TOC_length indicates the number of bytes present in the actual TOC.
4. A 10-byte Space has been reserved, such as for alignment stuffing.
5. A variable size set of /* Disc Parameters */ may be present, such as a Name of an Album( ) and a Name of a Catalogue( ).
6. A 4-byte disc_play_time indicates the total linear playing time of the disc expressed as a time code.
7. A 4-byte disc_name_pointer indicates the offset in bytes from the start of the Sub_TOC in question to the start of the disc_name( ) field. If the value in question is 0, this indicates that the disc_name( ) field is absent.
8. A 4-byte disc_date_pointer indicates the offset in bytes from the start of the Sub_TOC in question to the start of the disc_date( ) field. If the value in question is 0, this indicates that the disc_date( ) field is absent.
9. A 4-byte disc_copyright_pointer indicates the offset in bytes from the start of the Sub_TOC in question to the start of the disc_copyright( ) field. If the value in question is 0, this indicates that the disc-copyright( ) field is absent.
10. A 4-byte disc_publisher_pointer indicates the offset in bytes from the start of the Sub_TOC in question to the start of the disc_publisher( ) field. If the value in question is 0, this indicates that the disc_publisher( ) field is absent.
11. A variable size Track_List( ) may be present for each one of a plurality of audio tracks to contain an offset information with reference to the start of the TOC in question, plus various further items, such as the name of track and any of a great multiplicity of items that are presumably interesting to a listener of the recording in question.

Figure 6:
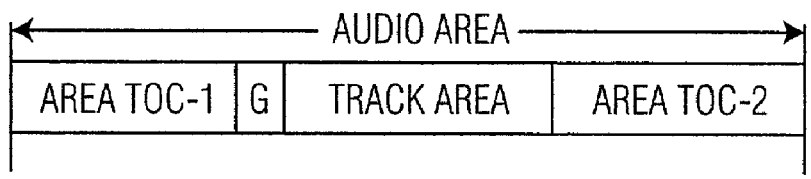
FIG. 6 depicts a data structure invention for an audio area of the record carrier in FIG. 1.

FIG. 6 shows an exemplary structure of an audio area 126, 128 in FIG. 5. Here, the track area is preceded by Area or Sub-TOC-1 and succeeded by Area TOC-2. These are two identical copies. Another manner of logical conformance may be produced by bit-wise inversion. Anyway, each copy taken separately must contain all information contained in the two TOCs. The locations thereof are for each separate Area TOC given in a higher level Master TOC. A gap between the Track Area and succeeding Area TOC-2 is not allowed. On the other hand, a gap between preceding Area TOC-1 and the Track Area is allowed, symbolized by area G. Such gap will generally not contain significant information, in particular, no other TOC or track. Therefore, logically the tack area will abut at both ends to the TOCS. Due to the doubling of the Area TOCs and their mutual distance, any interference therewith through environmental or other influences will usually not be doubled for the two copies. In consequence, the probability for correct storage of all parts of the Area TOC in at least one of the two versions thereof will be practically guaranteed, even without the providing of internal redundancy. Error correcting through such redundancy would often cost an unjustified delay. In fact, if the preceding TOC is correct, the starting of a track may be effected virtually immediately.

List of related documents:
(D1) Research Disclosure number 36411, August 1994, p. 412-413
(D2) PCT/IB97/01156 (PHN 16.452) 1 bit ADC and lossless compression of audio.
(D3) PCT/IB97/01303 (PHN 16.405), Audio compressor.
(D4) EP-A 402,973 (PHN 13.241), Audio compression.
(D5) A digital decimating filter for analog-to-digital conversion of hi-fi audio signals' by J. J. van der Kam in Philips Techn. Rev. 42, no. 6/7, April 1986, pp. 230-8.
(D6) A higher order topology for interpolative modulators for oversampling A/D converters', by Kirk C. H. Chao et al in IEEE Trans. on Circuits and Systems, Vol 37, no. 3, March 1990, pp. 309-18.

The invention claimed is:

1. A method for producing a unitary storage medium, comprising the steps of:
   providing at least two mutually logically conforming sub-TOCs for the same track area in one or more track areas of a unitary storage medium, each sub-TOC having structures for storing information for determining the configuration of the same information items stored in the track area, thereby allowing retrieving the configuration of the same information item in the track area from at least any correct copy of the sub-TOCs; and
   providing at least one master-TOC having structures for storing information for determining the position of the sub-TOCs.

2. The method of claim 1, further comprising the step of:
   storing the information items in the track area;
   storing in each of the sub-TOC structures the configuration of each of the information items including the content and position of the information items in the track area;
   storing in the master-TOC structures the information for determining the position of the at least two mutually logically conforming sub-TOCs.

3. The method of claim 1, wherein the information items include audio information.

4. The method of claim 1, wherein the unitary storage medium is an optical disc.

5. The method of claim 1, wherein the information is stored by pressing consumer discs from a master disc.

6. The method of claim 1, wherein the information is stored using an optical write head.

7. The method of claim 1, wherein two sub-TOCs assigned to the track area are positioned at opposite ends of the track area.

8. The method of claim 1, wherein the number of sub-TOCS assigned to the track area is exactly 2.

9. The method of claim 1, wherein the master-TOC is positioned at a predetermined offset location with respect to an initial location on the medium.

10. The method of claim 1, wherein the mutually logically conforming sub-TOCs are identical.

11. The method of claim 1, wherein the information in one of the at least two mutually logically conforming sub-TOCs is a bitwise inversion of the information in another of the at least two mutually logically conforming sub-TOCs.

12. The method of claim 1, wherein;
   the method further comprises the step of: storing the information items in the track area:
   storing in both the sub-TOCs structures the information for determining the content and position of each information item in the track area; storing in the master-TOC structures the information for determining the position of the at least two mutually logically conforming sub-TOCs;
   the information items include audio information;
   the storage medium is an optical disc;
   the information is recorded using a method selected from one or more of: pressing consumer discs from a master disc; using an optical write head;
   two sub-TOCs assigned to a track area are positioned at opposite ends of the track area;
   a sub-TOC assigned to a track area positioned at one end of the track area is separated from the one end of the track area by a gap;
   the number of sub-TOCs assigned to a track area is exactly 2;
   the master-TOC is positioned at a predetermined offset location with respect to an initial location on the medium;
   the mutually logically conforming sub-TOCs contain information selected from: identical information; and equivalent bitwise inverted information;
   the storage medium also includes a file structure, and the information items may be accessed using either the TOC structure or the file structure;
   the file system for audio conforms to a standard selected from; UDF, and ISO 9660;
   the file structure includes a root directory that points to the master-TOC and to sub-directories;
   the sub-directories include a sub-directory containing stereo audio information items and another sub-directory containing audio information items having three or more channels; and
   the storage of the audio information is selected from one or more of: a lossless compression format; and a lossy compression format.

13. A unitary storage medium, comprising:
   one or more track areas;
   at least two mutually logically conforming sub-TOCs assigned to a track area, each sub-TOC having information structures for storing information specifying the configuration of the same information items stored in the track area, thereby allowing retrieving the configuration information for the same information item in the track area from at least any correct copy of the sub-TOCs; and
   at least one master-TOC with information structures for storing information for determining the positions of each of the mutually logically conforming sub-TOCs.

14. The medium of claim 13, wherein the medium is an optically readable disc.

15. The medium of claim 13 wherein:
   information items are stored in the track areas; the information for determining the configuration of each information item in the track area is stored in each sub-TOC; and the information for determining the position of the at least two mutually logically conforming sub-TOCs is stored in the master-TOC;
   the information items include audio information;
   the information is recorded using a method selected from one or more of: pressing consumer discs from a master disc; using an optical write head;
   two sub-TOCs assigned to a track area are positioned at opposite ends of the track area;
   a sub-TOC assigned to a track area positioned at one end of the track area is separated from the one end of the track area by a gap;
   the number of sub-TOCs assigned to a track area is exactly 2;
   the master-TOC is positioned at a predetermined offset location with respect to an initial location on the medium;
   the mutually logically conforming sub-TOCs contain information selected from: identical information; and equivalent bitwise inverted information;
   the storage medium also includes a file structure, and the information items may be accessed using either the TOC structure or the file structure;
   the file system for audio information conforms to a standard selected from: UDF; and ISO 9660;
   the file structure includes a root directory that points to the master-TOC and to sub-directories;

the sub-directories include a sub-directory containing stereo audio information and a sub-directory containing audio information having three or more channels; and the storage of the audio information is selected from one or more of: a lossless compression format; and a lossy compression format.

16. The medium of claim 13, wherein the information in one of the at least two mutually logically conforming sub-TOCs is a bitwise inversion of the information in another of the at least two mutually logically conforming sub-TOCs.

17. Apparatus for controlling a reading device, comprising:

first control means for positioning a read head at information items stored in a track area of one or more track areas of a unitary storage medium, depending on configuration information read at times from each of at least two mutually logically conforming sub-TOCs assigned to the track area, each of the sub-TOCs specifying the configuration of the same information items stored in the track area, thereby allowing retrieving the configuration information for the sane information items from at least any correct copy of the at least two sub-TOCs; and second control means for positioning the read head at times at each of the at least two sub-TOCs depending on position information read from at least one master-TOC.

18. The reading control apparatus of claim 17 in which:

the storage medium is an optically readable disc;
the information items include audio information;
the information is recorded using a method selected from one or more of: pressing consumer discs from a master disc; using an optical write head;
two sub-TOCs assigned to a track area are positioned at opposite ends of the track area;
a sub-TOC assigned to a track area positioned at one end of the track area is separated from the one end of the track area by a gap;
the number of sub-TOCs assigned to a track area is exactly 2;
the master-TOC is positioned at a predetermined offset location with respect to an initial location on the medium;
the mutually logically conforming sub-TOCs contain information selected from: identical information; and equivalent bitwise inverted information;
the storage medium also includes a file structure, and the information items may be accessed using either the TOC structure or the file structure;
the file system for audio information conforms to a standard selected from: UDF; and ISO 9660;
the file structure includes a root directory that points to the master-TOC and to sub-directories;
the sub-directories include a sub-directory containing stereo audio information items and a sub-directory containing audio information items having three or more channels; and
the storage of the audio information is selected from one or more of: a lossless compression format; and a lossy compression format.

19. The apparatus of claim 17, wherein the information in one of the at least two mutually logically conforming sub-TOCs is a bitwise inversion of the information in another of the at least two mutually logically conforming sub-TOCs.

20. Apparatus for controlling a recording device with a write head, comprising:

first control means for positioning a write head to write information items in a track area of one or more track areas of a unitary storage medium, and writing the information items in the track area; and second control means for positioning the write head to write configuration information for the information items at times in each of at least two mutually logically conforming sub-TOCs assigned to the track area, and writing in each sub-TOC the configuration information for the same information items written in the track area, thereby allowing retrieving configuration information for the same information item from at least any correct copy of the mutually logically conforming sub-TOCs.

21. The recording device control apparatus of claim 20 in which:

the controller further comprising third control means for positioning the read head at a master-TOC, and writing information in information structures of the master-TOC for determining the position of each sub-TOC for the write area;
the storage medium is an optically readable disc;
the information items include audio information;
two sub-TOCs assigned to a track area are positioned at opposite ends of the track area;
a sub-TOC assigned to a track area positioned at one end of the track area is separated from the one end of the track area by a gap;
the number of sub-TOCs assigned to a track area is exactly 2;
the master-TOC is positioned at a predetermined offset location with respect to an initial location on the medium;
the mutually logically conforming sub-TOCs contain information selected from: identical information; and equivalent bitwise inverted information;
the storage medium also includes a file structure, and the information items may be accessed using either the TOC structure or the file structure;
the file system for audio information conforms to a standard selected from: UDF; ISO 9660;
the file structure includes a root directory that points to the master-TOC and to sub-directories;
the sub-directories include a sub-directory containing stereo audio information items and a sub-directory containing audio information items having three or more channels; and
the storage of the audio information is selected from one or more of: a lossless compression format: and a lossy compression format.

22. The apparatus of claim 20, wherein the information in one of the at least two mutually logically conforming sub-TOCs is a bitwise inversion of the information in another of the at least two mutually logically conforming sub-TOCs.

23. A reading device for a unitary media, comprising:
a read head for reading information from one or more track areas of a track of an optical disc;
a disc driver for driving the track with respect to the read head;
a clamping device for holding the disc in relation to the disc driver;
control means for controlling the reading device
the control means positioning a read head with respect to the track depending on configuration information including position information read at times from each of at least two mutually logically conforming sub-TOCs assigned to each track area, each sub-TOC specifying the configuration of each information item stored in the track area, thereby allowing retrieving configuration information for any information items from at least any correct copy of the mutually logically conforming sub-TOCs; and the control means positioning the read head at each of the at least two sub-TOCs depending on position information read from at least one master-TOC.

24. The reading device of claim 23 in which:
the storage medium is an optically readable disc;
the information items include audio information;
the information is recorded using a method selected from one or more of: pressing consumer discs from a master disc; using an optical write head;
two sub-TOCs assigned to a track area are positioned at opposite ends of the track area;
a sub-TOC assigned to a track area positioned at one end of the track area is separated from the one end of the track area by a gap;
the number of sub-TOCs assigned to a track area is exactly 2;
the master-TOC is positioned at a predetermined offset location with respect to an initial location on the medium;
the mutually logically conforming sub-TOCs contain information selected from: identical information; and equivalent bitwise inverted information;
the storage medium also includes a file structure, and the information items may be accessed using either the TOC structure or the file structure;
the file system for audio information conforms to a standard selected from: UDF; and ISO 9660;
the file structure includes a root directory that points to the master-TOC and to sub-directories;
the sub-directories include a sub-directory containing stereo audio information items and a sub-directory containing audio information items having three or more channels; and
the storage of the audio information is selected from one or more of: a lossless compression format; and a lossy compression format.

25. The reading device of claim 23, wherein the information in one of the at least two mutually logically conforming sub-TOCs is a bitwise inversion of the information in another of the at least two mutually logically conforming sub-TOCS.

26. A recording device for a unitary storage medium, comprising:
a master disc;
means for pressing consumer discs from the master disc to record the consumer discs;
and in which the master disc includes:
one or more track areas;
at least two mutually logically conforming sub-TOCs assigned to a track area, each sub-TOC having information structures specifying the configuration of each information item stored in the track area, thereby allowing retrieving the configuration of any information item at least from any correct copy of the sub-TOCs; and
at least one master-TOC with information structures specifying the positions of each of the mutually logically conforming sub-TOCs.

27. The recording device of claim 26 in which:
the storage medium is an optically readable disc;
the information items include audio information;
the information items are recorded using an optical write head in the process for producing the master disc;
two sub-TOCs assigned to a track area are positioned at opposite ends of the track area;
a sub-TOC assigned to a track area positioned at one end of the track area is separated from the one end of the track area by a gap;
the number of sub-TOCs assigned to a track area is exactly 2;
the master-TOC is positioned at a predetermined offset location with respect to an initial location on the medium;
the mutually logically conforming sub-TOCs contain information selected from: identical information; and equivalent bitwise inverted information;
the storage medium also includes a file structure, and the information items may be accessed using either the TOC structure or the file structure;
the file system for audio information conforms to a standard selected from: UDF; and ISO 9660;
the file structure includes a root directory that points to the master-TOC and to sub-directories:
the sub-directories include a sub-directory containing stereo audio information items and a sub-directory containing audio information items having three or more channels; and
the storage of the audio information is selected from one or more of: a lossless compression format; and a lossy compression format.

28. The reading device of claim 26, wherein the information in one of the at least two mutually logically conforming sub-TOCs is a bitwise inversion of the information in another of the at least two mutually logically conforming sub-TOCs.

29. A recording device with a write head for a unitary storage medium, comprising:
a write head for recording information on one or more track areas of a track of an optical disc;
disc driver for driving the track with respect to the write head;
a clamping device for holding the disc fixed in relation to the disc drive means;
control means for controlling the recording device;
the control means positioning the write head at times to write the information items in a track area and for subsequently writing the information items in the track area;
the control means positioning the write head at times to write, in at least two mutually logically conforming sub-TOCs assigned to each track area, configuration information of the information items, each sub-TOC having structures for storing configuration information for each of the information items stored in the track area, and for subsequently writing the information item configuration information into the sub-TOC structures, thereby allowing retrieving configuration information for any information items from at least any correct copy of the mutually logically conforming sub-TOCs.

30. The recording device of claim 29 in which:
the control means position the write head to write, in at least one master-TOC, information for determining the positions of the sub-TOCs, the master-TOC having structures for storing the information for determining the positions of each sub-TOC, and for writing the sub-TOC position determining information into the master-TOC structures;

the control means position the write head to write at least two mutually logically conforming sub-TOCs for the same track area of the unitary storage medium, each sub-TOC having structures for storing information for determining the configuration of each information items stored in the track area, thereby allowing retrieving the configuration of any information item in the track area from at least any correct copy of the sub-TOCs;

the control means position the write head to write at least one master-TOC having structures for storing information for determining the position of the sub-TOCs;

the write head is a read/write head used for reading information from the medium and writing information to the medium, the control means position the write head to read the information items stored in the track area depending on configuration information read at items from each of the mutually logically conforming sub-TOCs assigned to the track area, each of the sub-TOCs specifying the configuration of the same information items stored in the track area, thereby allowing retrieving the configuration information for the same information items from at least any correct copy of the at least two sub-TOCs; the control means control the reading of each information item by the write head positioned at the information item in the track area;

the control means position the write head at times to read the information item configuration information at times from each of the sub-TOCs depending on position information read from the master-TOC; the control means control the reading of the configuration information by the write head positioned at each sub-TOC;

the control means position the write head at times to read the position information of the sub-TOCs from the master-TOC and control the reading of the position information from the master-TOC;

the storage medium is an optically readable disc;

the information items include audio information;

two sub-TOCs assigned to a track area are positioned at opposite ends of the track area;

a sub-TOC assigned to a track area positioned at one end of the track area is separated from the one end of the track area by a gap;

the number of sub-TOCs assigned to a track area is exactly 2;

the master-TOC is positioned at a predetermined offset location with respect to an initial location on the medium;

the mutually logically conforming sub-TOCs contain information selected from: identical information; and equivalent bitwise inverted information;

the storage medium also includes a file structure, and the information items may be accessed using either the TOC structure or the file structure;

the file system for audio information conforms to a standard selected from: UDF; and ISO 9660;

the file structure includes a root directory that points to the master-TOC and to sub-directories;

the sub-directories include a sub-directory containing stereo audio information items and a sub-directory containing audio information items having three or more channels; and the storage of the audio information is selected from one or more or: a lossless compression format; and a lossy compression format.

31. The recording device of claim 29, wherein the information in one of the at least two mutually logically conforming sub-TOCs is a bitwise inversion of the information in another of the at least two mutually logically conforming sub-TOCs.

32. An optical disc for storing audio-centered information on a unitary storage medium using a Table-of Contents (TOC) mechanism for therein specifying an actual configuration of various audio items on the medium, produced by the method of:

assigning at least two mutually logically conforming Sub-TOCs to each one of a set of one or more Track Areas on the unitary storage medium, thereby allowing retrieving any constituent Sub-TOC part from at least any correct copy of the Sub-TOCs; and providing at least one master-TOC for specifically pointing to each of the Sub-TOCs.

33. The optical disc of claim 32, wherein information in one of the at least two mutually logically conforming sub-TOCs is a bitwise inversion of information in another of the at least two mutually logically conforming sub-TOCs.

* * * * *